United States Patent
Citroen

[15] 3,640,545
[45] Feb. 8, 1972

[54] AUTOMOBILE VEHICLE

[72] Inventor: Armand Citroen, Neuilly-sur-Seine, France

[73] Assignee: Societe Nationale D'Etude et de Construction de Moteurs D'Aviation, Paris, France

[22] Filed: Nov. 24, 1969

[21] Appl. No.: 879,276

[30] Foreign Application Priority Data

Nov. 26, 1968 France..................................175312
Nov. 15, 1969 France..................................6939929

[52] U.S. Cl..........................................................280/124
[51] Int. Cl............................................................B60g 9/02
[58] Field of Search..............280/124, 106, 106.5; 267/15, 267/20, 21, 63; 296/28

[56] References Cited

UNITED STATES PATENTS

| | | | |
|---|---|---|---|
| 2,059,212 | 11/1936 | Dorst | 267/21 X |
| 2,160,608 | 5/1939 | Watson | 267/20 X |
| 2,549,320 | 4/1951 | Makin | 280/124 X |
| 2,558,310 | 6/1951 | Moore | 280/124 X |

*Primary Examiner*—Trygve M. Blix
*Assistant Examiner*—Carl A. Rutledge
*Attorney*—Charles E. Temko

[57] ABSTRACT

Automobile vehicle construction having a body coupled to wheels, preferably three in number, by a suspension system comprising levers rotatably mounted about the wheel axles, and members of rubberlike elasticity, acting longitudinally, the points of attachment to the body being such that the deformation of the members is substantially greater than the corresponding movement of the body.

5 Claims, 16 Drawing Figures

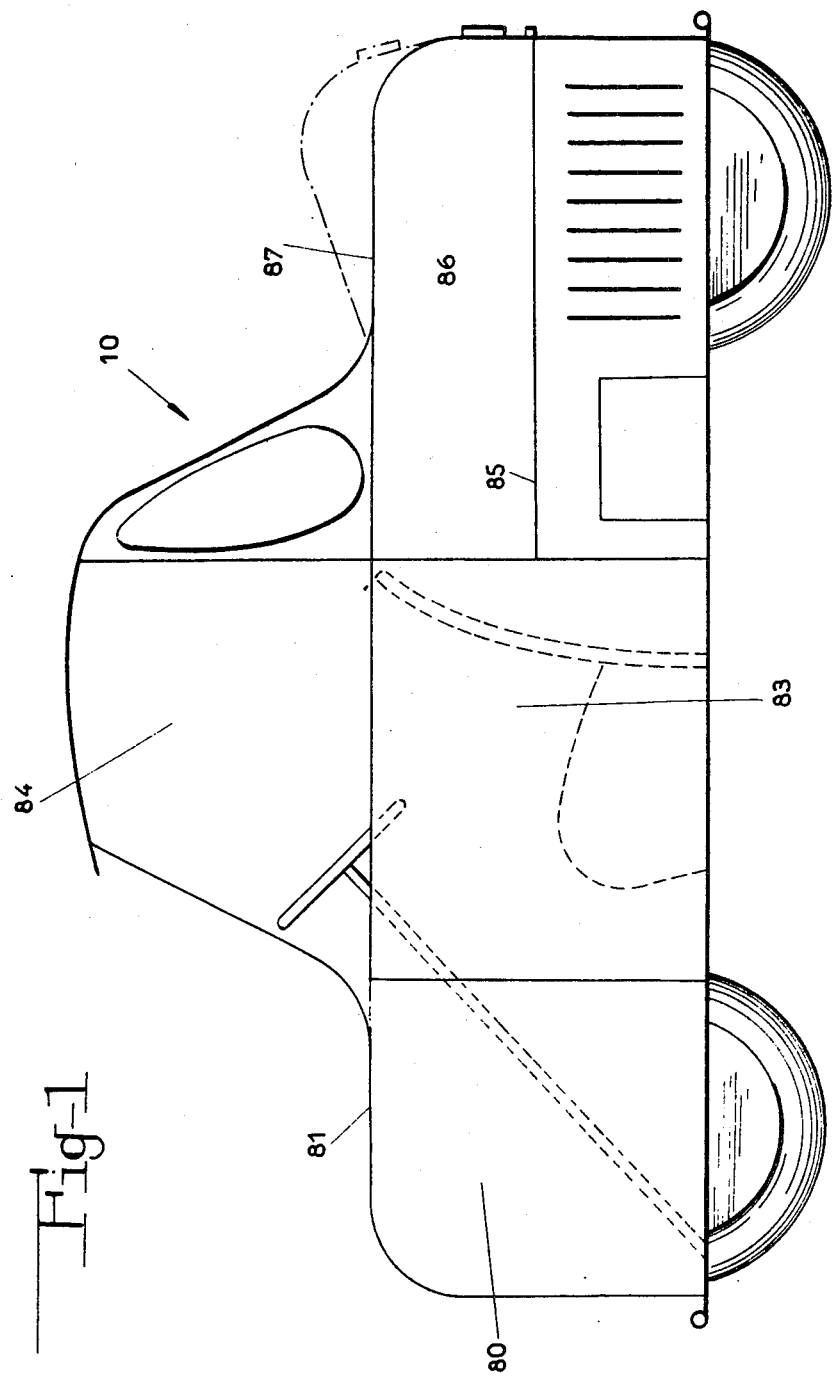

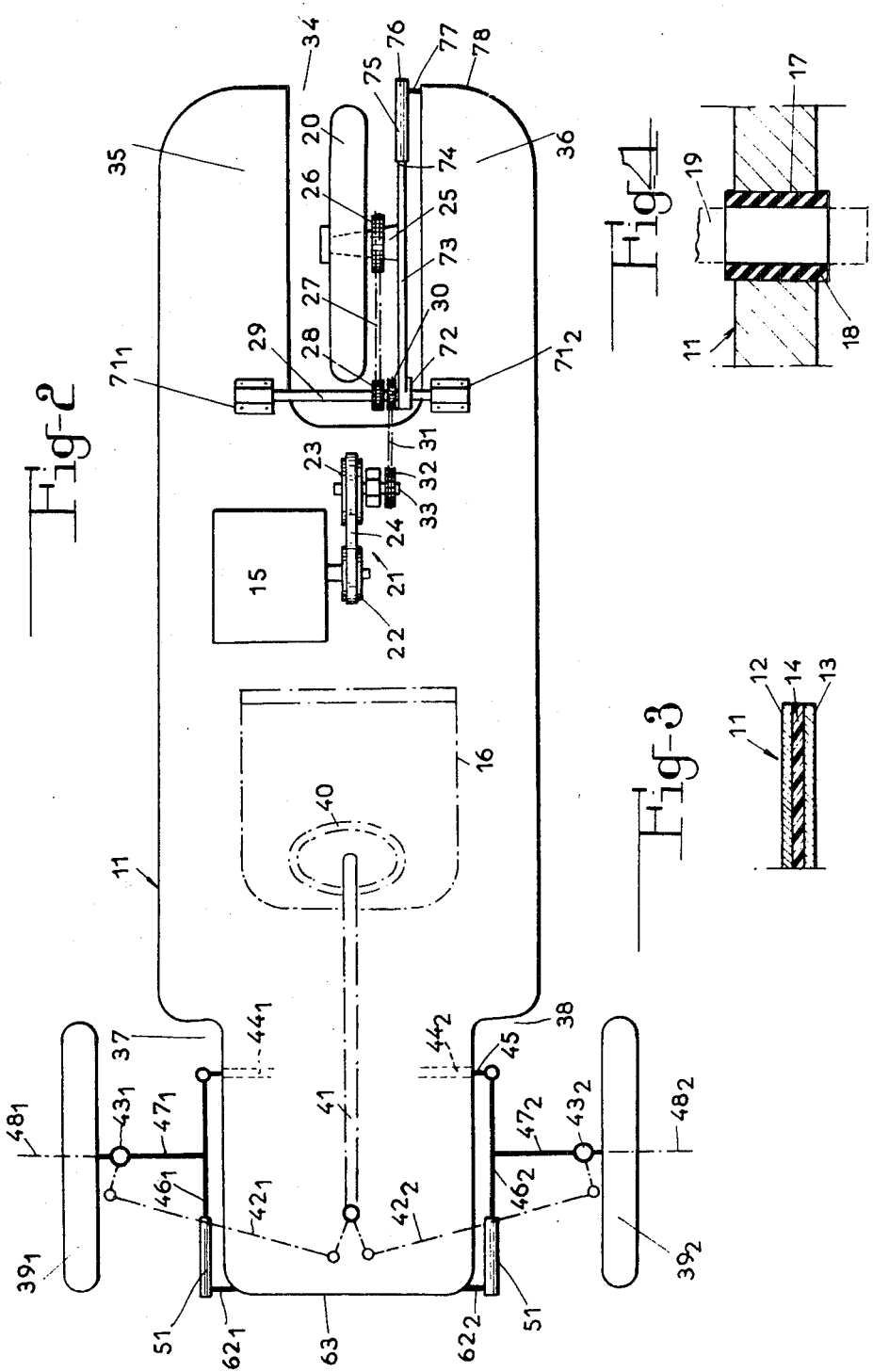

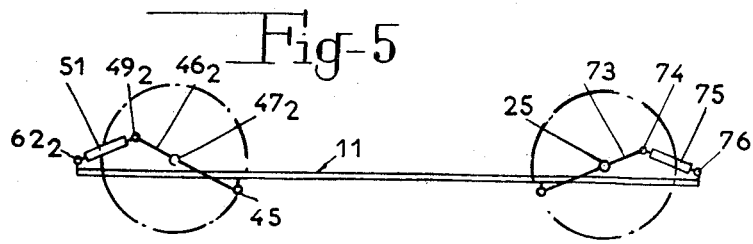
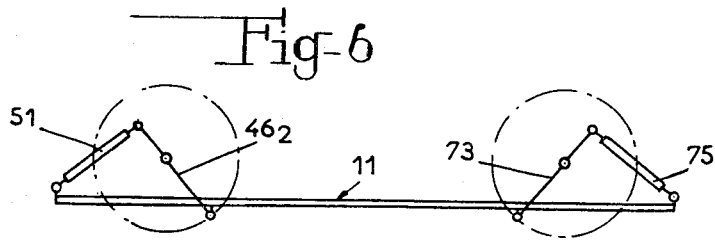
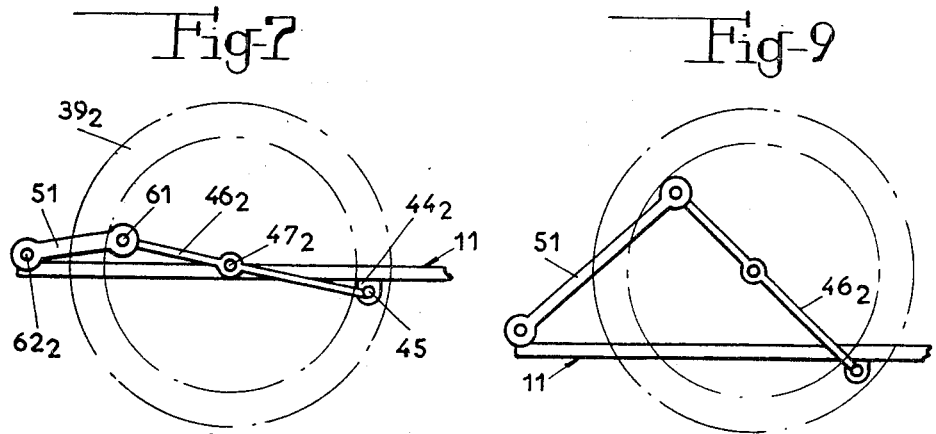
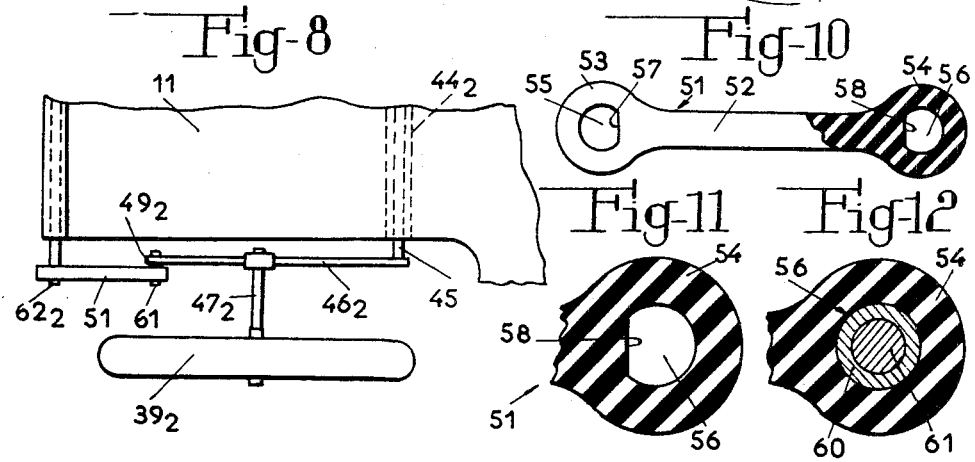

PATENTED FEB 8 1972

AUTOMOBILE VEHICLE

The invention relates to motor vehicle.

Motorized vehicles, other than motorcycles and motorbikes, are usually provided with room for four or five or two or three. These vehicles have an elevated price and have created a congestion in the urban agglomerations such that the traffic today is difficult and sometimes impossible.

The utilization of two-wheeled vehicles such as the motorbike and the motorcycle has remained limited on account of the lack of comfort for the user who is exposed to all sorts of bad weather: rain, wind, etc.

Attempts until now with regard to urban vehicles have not resulted in success: the vehicle, a reduction of a known vehicle, often is either too expensive or else requires techniques which are not yet available.

The motor vehicle according to the invention overcomes this difficulty. It is designed for transporting a single passenger and can utilize motors which are presently massproduced for two-wheeled vehicles (motorcycles and motorbikes), including a cabin which is closed on all sides and effectively protects the occupant. It is extremely lightweight, moreover, owing to its suspension, it avoids the discomfort usually associated with very lightweight vehicles.

The vehicle according to the invention is characterized by the fact that its body comprising a cabin is coupled to the wheels, preferably three in number, two in the front and one in the rear, by a suspension system comprising levers rotatably mounted about the wheel axles, and members of rubberlike elasticity, acting longitudinally, the points of attachment to the vehicle body being chosen in order that the deformation of the said members is substantially greater than the lowering and raising of the body.

The amount of the deformation permitted by the play in the rubberlike members assures an exceptional smoothness of suspension for a lightweight vehicle.

Further, the positioning of the mounting points of the levers and of the elastic members is chosen so that the transmission of force, during loading, increases the stiffness of the suspension as the load increases.

According to one embodiment, the elastic members are attached to the front and rear ends of the body. The attachment of the levers to the body of the vehicle remote from these extremities reduces the effect of the resultant moments during braking and acceleration.

The description which follows, made by way of example, refers to the accompanying drawings, wherein:

FIG. 1 is a schematic view in lateral elevation of a motor vehicle according to the invention;

FIG. 2 is a plan view of the body of the vehicle including a platform with the equipment it supports with the cabin and the body shell removed;

FIG. 3 is a view in vertical section of a part of the platform;

FIG. 4 is a view in section of means for fastening an equipment to the platform;

FIG. 5 is a schematic showing of the platform supported by the wheels without a load;

FIG. 6 is analogous to FIG. 5, but with a load;

FIG. 7 is an elevation view of the front part of the platform with its coupling to an adjacent wheel for suspension;

FIG. 8 is a corresponding plan view;

FIG. 9 is analogous to the view of FIG. 7, but under other conditions;

FIG. 10 is a view in longitudinal section of an elastic suspension member;

FIG. 11 is a view on a larger scale of part of said member;

FIG. 12 is analogous to the view of FIG. 11, but after mounting of said member;

Figure 14:
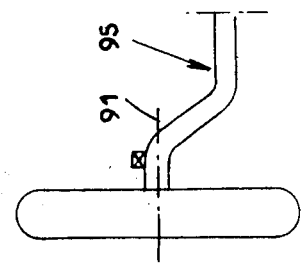
FIG. 14 is a cross section along line 14—14 of FIG. 13.

The body (FIGS. 1 and 2) of the vehicle 10 includes a chassis, which is preferably a platform 11 of a composite material comprising two sheets 12 and 13 (FIG. 3) of lightweight alloy stuck to the sides of a intermediate sheet 14 formed of synthetic resinous foam or a lightweight wood such as balsa. Such a platform or plate displays considerable strength in bending as well as in torsion.

Immediately to each side of the transverse axis of platform are secured a motor 15 on the side thereof towards the rear and a seat 16 for the single occupant of the vehicle on the other side. The securing may be effected by bolting; alternatively holes 17 (FIG. 4) may be provided through the platform or plate 11 and inserted with sleeves of rubber or the like 18 into which are driven securing pins 19 for rigidly fixing elements to be secured.

The motor 15 may be of the type commonly used in two-wheeled vehicles (motorcycles and motorbikes). The driving of the rear wheel is effected by the intermediary of a speed control 21 comprising, for example, two pulleys 22 and 23 interconnected by a belt 24. A pinion gear 26 is keyed to the axle 25 of the rear wheel and is driven by a chain 27 which passes over a pinion gear 28. The pinion gear 28 is keyed to the transverse axle 29 which also carries another pinion gear 30 driven by a chain 31 which passes over a pinion gear 32 keyed to the axle of the pulley 23.

The wheel is located in a cutout portion 34 formed in the rear part of the platform 11 and which thus defines therein two legs 35 and 36.

In the forward part of the platform 11 are located two cutouts 37 and 38, in order to permit the turning of the front wheels $39_1$ and $39_2$, by means of the steering mechanism comprising a steering wheel 40, a steering column 41 and steering rods $42_1$ and $42_2$ to the kingpins $43_1$, $43_2$.

The platform provides two forward brackets $44_1$, $44_2$ which can form the extremities of a transverse part 45 (FIG. 8) and by means of such brackets the transverse part is mounted for rotation on the levers $46_1$, $46_2$ which in turn are mounted for rotation about the transverse axles $47_1$, $47_2$ which are located in the horizontal plane of the wheel axles $48_1$, $48_2$ respectively and rigidly with respect to the vertical pins $43_1$ and $43_2$.

At the other ends $49_1$, $49_2$ of the levers $46_1$, $46_2$ are rotatively connected the ends of elastic members 51, formed of rubber or the like, comprising an elongate body 52, preferably square or rectangular in cross section, terminating in collars 53 and 54 (FIG. 10) having apertures 55 and 56 with flattened sides 57 and 58. The transverse section of each collar is equal to at least one-half of the transverse section of the body in its unsolicited condition. Sleeves 60 are forced into the collars 54 and become fixes thereto, and pins 61, which form the ends of the levers 46, are rotatably mounted in the sleeves. Such a construction resists the detachment of the collar from its mounting and avoids stress concentrations and thereby reduces the risk of tearing.

Similarly, the other ends 53 of the longitudinally elastic member 51 are mounted for rotation about the pins $62_1$ and $62_2$ fixed to the platform 11. The pins are located transverse to the longitudinal axis of the platform and extend substantially along the forward edge 63 of the platform.

The mounting of the rear part of the platform on the rear wheel is effected in an analogous manner. The shaft 29 is supported in bushings $71_1$, $72_2$ on the legs 35 and 36 in the proximity of their attachment. A lever 73 is mounted for rotation about the shaft 29 at its end 72 and pivots about the axle 25 of the rear wheel at its central portion. The other end 74 of the lever 75 is mounted for rotation at an end of a longitudinally elastic member or rod of rubber 75, analogous to the members 51. The outer end 76 of said member 75 is mounted for rotation about a transverse pin which is fixed to the platform 11 and substantially in the plane of the rearward edge 78.

There is room for the operator's legs in the forward compartment which is covered by a lid 81. The body 82 is preferably of press-formed plastics material and portions of the body are fixed to the floor or plate by screws or bolts. The body may also be formed of aluminum. The doors 83 are preferably slidably mounted.

Behind the cabin 84, a casing 85 protects the motor and its mechanisms. The casing limits the baggage boot 86 which has a cover 87 pivotally mounted by its forward edge.

When the vehicle is not loaded, the suspension is in the position shown in FIG. 5. The rubberlike members 51 are preferably maintained under a certain tension resulting from the positioning of the mounting pins. The angle between the members 51, 75 and the corresponding levers 46, 73 is relatively great, that is to say quite obtuse.

When the vehicle is loaded, for example, when the user gets into the vehicle, the platform 11 lowers; the levers 46 and 73 turn about the perspective axles 47 and 29, and the elastic members 51 and 75 undergo a tensile force which deforms and elongates the members until an equilibrium is reached. The stiffness of said members increases during their elongation, the angle between the levers 46 and the elastic members 51 decreases, approaching 90°. By the system according to the invention, a suspension is therefore obtained which is both smooth and which avoids a bumpy ride. The positioning of the fixation of levers 46 and 73 on the platform 11, relatively close to the central zone of the latter, is favorable to the mechanical behavior and to the stability.

Figure 13:
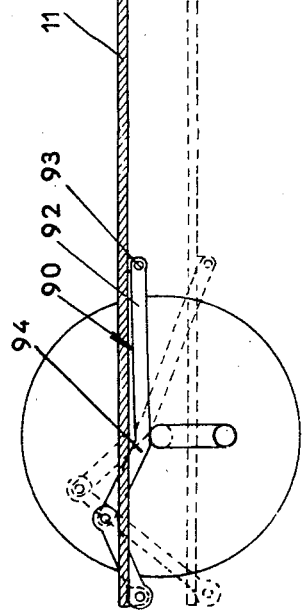
FIG. 13 is a very schematic view showing two conditions of the vehicle according to the invention, for another embodiment.

In a modification, lever 90 (FIG. 13), rotatively mounted around an axle 91 linked to the wheels instead of having two aligned branches, has an internal branch 92 pivotally mounted on a bushing 93 and is parallel to the platform 11 in the condition in which the vehicle is not loaded (this condition being shown in full line whereas the loaded condition is shown in broken lines) and another ascending arm 94. A crossmember 95 is moreover provided between the two wheels of a train, thus increasing the mechanical strength. The crossmember is bent to pass under the platform.

In another embodiment, the levers are connected to each other by a crossmember, thus forming a frame, the transversal side of which is rotatively mounted on one or more bearings fixed to the forward end of the platform, the elastic members being then mounted at the rearward ends of said levers.

Figure 15:
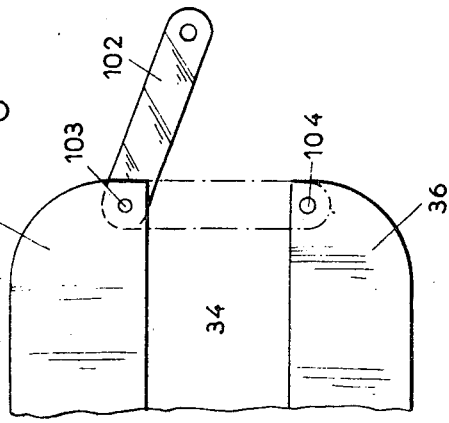
FIG. 15 is a plan view of the rear part of a platform of an alternative.

Referring now to FIG. 15, in this embodiment, the opening in the housing, provided between the legs 35 and 36 for the rear wheel, may be sealed off by a connecting strip 102 which is pivotally mounted about a pin 103 and retainable in closed position by a latching pin 104.

Figure 16:
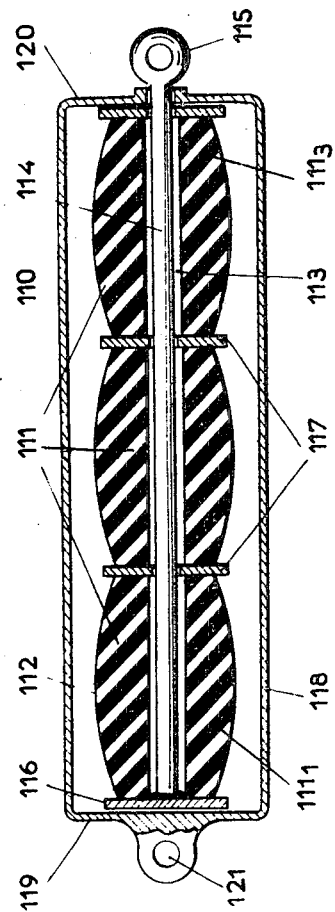
FIG. 16 is a longitudinal view in section of a suspension member according to another embodiment.

Reference is now made to FIG. 16, relative to an alternative embodiment of the elastic member. In this embodiment, the elastic member 110 is formed by a stack of several sleeves 111 of rubber which may have convex external surfaces 112 in the nonsollicited condition and a channel 103 through which passes a common shaft 114. One end 115 of the shaft 114 is formed as a ring and the other is formed as a pressure bearing plate 116; intermediate plates 117 may be provided between adjacent sleeves. The combination is enclosed in a cylindrical casing 118 in which the end 119, opposite the end 120 adjacent to the ring 115, is provided with an apertured lug 121 for the second connection to the suspension member.

I claim:

1. A motor vehicle including a chassis and wheels mounted on wheel axles connected to said chassis by a suspension system, comprising: a lever for each wheel carrying the wheel axle of its associated wheel, and a rubberlike elastic member pivotally connected to one end of the chassis and to one end of said lever, the other end of the lever being pivoted to the chassis, the wheel axle being substantially aligned with said ends of the lever whereby the deformation of the links of said members is substantially greater than the rising or lowering of said chassis when it moves from its loaded condition to its nonloaded condition or vice versa, said elastic member comprising a rod of elastomeric material.

2. A motor vehicle in accordance with claim 1, wherein the rod includes at each end thereof an aperture for connection with the chassis and the lever, respectively.

3. A vehicle in accordance with claim 2, further comprising in each aperture a metallic sleeve fixed to the elastomeric material for hingedly connecting the said rod.

4. A motor vehicle including a chassis and wheels mounted on wheel axles connected to said chassis by a suspension system, comprising: a lever for each wheel carrying the wheel axle of its associated wheel, and a rubberlike elastic member pivotally connected to one end of the chassis and to one end of said lever, the other end of the lever being pivoted to the chassis, the wheel axle being substantially aligned with said ends of the lever whereby the deformation of the links of said members is substantially greater than the rising or lowering of said chassis when it moves from its loaded condition to its nonloaded condition, or vice versa; the lightweight chassis being constituted by a plate supporting the body, the serviceable load and the motor, if need be, said plate being constituted by a panel sandwich comprising two plates of lightweight metal joined to one another by an intermediary lightweight rib made of a material selected from resinous foam and lightweight wood.

5. A vehicle according to claim 4, comprising two coupled wheels and a third wheel, said plate being provided with a slot along the longitudinal axis of the vehicle for receiving said third wheel.

* * * * *